United States Patent [19]

McCormack et al.

[11] Patent Number: 5,628,833

[45] Date of Patent: May 13, 1997

[54] TWO-STEP CLEANING OR DEWATERING WITH SILOXANE AZEOTROPES

[75] Inventors: Cheryl A. McCormack, Bay City; Dwight E. Williams, Midland, both of Mich.

[73] Assignee: Dow Corning Corporation, Midland, Mich.

[21] Appl. No.: 322,643

[22] Filed: Oct. 13, 1994

[51] Int. Cl.$^6$ .................... B08B 3/04; B08B 3/08
[52] U.S. Cl. .................. 134/26; 134/38; 134/39; 134/42
[58] Field of Search ............... 134/26, 39, 42, 134/38; 252/174.15, DIG. 9

[56] References Cited

U.S. PATENT DOCUMENTS

| | | | |
|---|---|---|---|
| 4,933,002 | 6/1990 | Petroff | 71/116 |
| 5,443,747 | 8/1995 | Inada et al. | 134/40 |
| 5,454,970 | 10/1995 | Flaningam et al. | 252/174.15 |
| 5,454,972 | 10/1995 | Williams et al. | 252/174.15 |
| 5,456,856 | 10/1995 | Flaningam et al. | 252/174.15 |
| 5,478,493 | 12/1995 | Flaningam et al. | 252/174.15 |
| 5,503,681 | 4/1996 | Inada et al. | 134/1 |

FOREIGN PATENT DOCUMENTS 473795  3/1992  European Pat. Off. .

*Primary Examiner*—Zeinab El-Arini
*Attorney, Agent, or Firm*—James L. DeCesare

[57] ABSTRACT

A process for cleaning or dewatering a surface in which there is applied to the surface a washing composition containing a volatile methyl siloxane such as hexamethyldisiloxane or octamethyltrisiloxane, and an agent for enhancing cleaning or dewatering such as a glycol ether or surface active agent. While the surface is still wet with the washing composition, it is rinsed with an azeotrope containing hexamethyldisiloxane or octamethyltrisiloxane, and 2-pentanol, 2-methyl-1-pentanol, 3-methyl-3-pentanol, 1-methoxy-2-propanol, 1-butoxy-2-propanol, 1-hexanol, n-propoxypropanol, or ethyl lactate. The surface is then dried or permitted to dry.

22 Claims, No Drawings

TWO-STEP CLEANING OR DEWATERING WITH SILOXANE AZEOTROPES

BACKGROUND OF THE INVENTION

The purpose of this invention is to improve environmentally friendly cleaning or dewatering agents, and more particularly to provide a more effective and efficient process for cleaning or for dewatering a surface, by using as a rinsing agent, an azeotrope containing a volatile methyl siloxane (VMS); instead of rinsing with only a VMS.

Because of local, state, federal, and international regulations, aimed at restricting the use of certain chemicals, the search for suitable replacements is an ever increasing dilemma faced by the chemical and industrial sectors.

The replacement of "outlawed" chemicals with certain volatile methyl siloxanes (VMS) as a solvent substitute is now a viable approach however. Thus, in America, the Environmental Protection Agency (EPA) has now determined that volatile methyl siloxanes such as dodecamethylcyclohexasiloxane, hexamethyldisiloxane, octamethyltrisiloxane, and decamethyltetrasiloxane, are acceptable substitutes for CFC-113 the chlorofluorocarbon ($C_2Cl_1F_3$), and methylchloroform (MCF), for cleaning in closed systems, in metal cleaning, electronics cleaning, and precision cleaning applications, under their Significant New Alternatives Policy (SNAP).

Most recently, the EPA in Volume 59, No. 165, of the Federal Register, Pages 44240–44256, (Aug. 26, 1994), made public their determination that two more volatile methyl siloxanes "Octamethylcyclotetrasiloxane and decamethylcyclopentasiloxane are acceptable alternatives to MCF and CFC-113" for cleaning in closed systems, in the same end uses under their SNAP policy.

By virtue of these acceptable EPA findings on certain volatile methyl siloxanes as solvent alternatives, the demand for VMS materials is now increasing. With increased use and demand goes a corresponding demand for more effective and efficient processing techniques.

While the current use of VMS in washing applications is effective, it has unexpectedly been discovered that their use in two-step methods can be improved according to the techniques of this invention. Thus, the problem to be solved by this invention is to improve two-step washing which use VMS. This problem is solved by employing VMS in the rinsing step in the form of an azeotrope, instead of using only VMS for rinsing.

SUMMARY OF THE INVENTION

Accordingly, the invention is directed to a process for cleaning or dewatering a surface. In the process, there is applied to a surface to be cleaned or dewatered, a washing composition. The washing composition is a mixture containing a volatile methyl siloxane (VMS) and an agent for enhancing either cleaning or dewatering. The VMS in the washing composition is most preferably hexamethyldisiloxane or octamethyltrisiloxane, although there can also be employed a VMS such as decamethyltetrasiloxane, octamethylcyclotetrasiloxane, or decamethylcyclopentasiloxane, if desired.

For cleaning processes, the cleaning agent enhancer in the washing composition is a surface active agent or a glycol ether. For dewatering processes, the dewatering agent enhancer in the washing composition is a surface active agent. Other enhancers can also be employed, if desired, such as non-volatile organic compounds which dissolve completely in the volatile methyl siloxane, and which bear at least one hydroxyl, ether, or carbonyl group in the molecule. For such purposes, non-volatile is considered to be a material exhibiting a vapor pressure of less than 0.1 Torr (0.1 mm Hg) measured at 20° Centigrade.

While the cleaned or dewatered surface is still wet with the washing composition, the surface is rinsed with a rinsing composition which is an azeotrope containing a volatile methyl siloxane (VMS), and a volatile organic compound which is a liquid at twenty degrees Centigrade and which bears at least one hydroxyl, ether, or carbonyl group in the molecule. For such purposes, volatile is considered to be a material exhibiting a vapor pressure of more than 0.1 Torr (0.1 mm Hg) measured at 20° Centigrade. Preferably, an alcohol is used to form the azeotrope with the volatile methyl siloxane.

Most preferred, however, are azeotropes containing a VMS such as hexamethyldisiloxane or octamethyltrisiloxane, and either an alcohol such as 2-pentanol, 2-methyl-1-pentanol, 3-methyl-3pentanol, 1-methoxy-2-propanol, 1-butoxy-2-propanol, 1-hexanol, n-propoxypropanol; or an ester such as ethyl lactate.

The washed and rinsed surface is then dried or permitted to dry.

While the process can be used to remove contaminants including water from any surface, the process is particularly useful in applications related to dewatering, defluxing and precision cleaning, in conjunction with rinsing by immersion or with a freshly condensed vapor. The unexpected advantages and benefits of these azeotropes as rinsing agents include enhanced solvency power and the maintenance of a constant solvency power following evaporation which may occur during applications involving vapor phase rinsing, distillative regeneration, and hand wiping.

Because the rinsing agent according to the invention is an azeotrope, it possesses the added advantage and benefit of being more easily recovered and recirculated. Thus, the azeotrope can be separated from the contaminated rinsing bath effluent after its use in cleaning or dewatering. By simple distillation, its regeneration is facilitated whereby it may be recirculated in the system as a fresh rinsing agent influent.

In addition, the most preferred azeotropes provide an unexpected advantage in being higher in siloxane fluid content and correspondingly lower in alcohol content, than azeotropes of siloxane fluids and lower molecular weight alcohols such as ethanol. The surprising result is that the preferred azeotropes of the invention are less inclined to generate tropospheric ozone and smog.

Azeotrope-like or pseudo-azeotrope compositions are also useful for rinsing, which contain hexamethyldisiloxane or octamethyltrisiloxane, an alcohol such as 2-pentanol, 2-methyl-1pentanol, 3-methyl-3-pentanol, 1-methoxy-2-propanol, 1-butoxy-2-propanol, 1-hexanol, n-propoxypropanol, or the ester ethyl lactate.

These and other features, objects, and advantages, of the present invention will become more apparent from a consideration of the following detailed description thereof.

DETAILED DESCRIPTION OF THE INVENTION

An azeotrope is a mixture of two or more liquids, the composition of which does not change upon distillation. For example, a mixture of 95% ethanol and 5% water boils at a lower temperature of 78.15° Centigrade, than either pure ethanol which boils at a temperature of 78.3° Centigrade, or pure water which boils at a temperature of 100° Centigrade. Such liquid mixtures behave like a single substance in that the vapor produced by partial evaporation of liquid has the same composition as the liquid. Thus, these mixtures distill at a constant temperature without change in their composition and cannot be separated by normal distillation procedures.

Azeotropes exist in systems containing two liquids (A and B) termed binary azeotropes, in systems containing three liquids (A, B, and C) termed ternary azeotropes, and in systems containing four liquids (A, B, C, and D) termed quaternary azeotropes. The azeotropes of this invention are binary azeotropes.

For purposes of this invention, a mixture of two or more components is azeotropic, if it vaporizes with no change in the composition of the vapor from the liquid. Specifically, azeotropic mixtures include both mixtures that boil without changing composition, and mixtures that evaporate at a temperature below the boiling point without changing composition.

Accordingly, an azeotropic mixture may include mixtures of two components over a range of proportions where each specific proportion of the two components is azeotropic at a certain temperature, but not necessarily at other temperatures.

Azeotropes vaporize with no change in their composition. If the applied pressure is above the vapor pressure of the azeotrope, the azeotrope evaporates without change. If the applied pressure is below the vapor pressure of the azeotrope, the azeotrope boils or distills without change. The vapor pressure of low boiling azeotropes is higher, and the boiling point is lower than that of the individual components. In fact, the azeotropic composition has the lowest boiling point of any composition of its components. Thus, the azeotrope can be obtained by distillation of a mixture whose composition initially departs from that of the azeotrope.

Since only certain combinations of components can form azeotropes, the formation of an azeotrope cannot be reliably predicted without experimental vapor-liquid-equilibria (VLE) data, that is vapor and liquid compositions at constant total pressure or temperature for various mixtures of the components.

The composition of some azeotropes is invariant to temperature, but in many cases, however, the azeotropic composition shifts with temperature. The azeotropic composition as a function of temperature can be determined from high quality VLE data at a given temperature. Commercial software is available to make such determinations. The ASPENPLUS® program of Aspen Technology, Inc., of Cambridge, Mass., is an example of such a program. Given experimental data, such programs can calculate parameters from which complete tables of composition and vapor pressure may be generated. This allows a user of the system to determine where an azeotropic composition is located.

As noted above, azeotrope-like or pseudo-azeotrope compositions can also be used as rinsing agents according to the invention. For purposes of the present invention, azeotrope-like and pseudo-azeotrope is intended to mean a composition that behaves like an azeotrope. Thus, an azeotrope-like composition has constant boiling characteristics, or it has a tendency not to fractionate upon boiling or evaporation. In an azeotrope-like composition, the composition of the vapor which is formed during boiling or evaporation, is identical or substantially identical to the composition of the original liquid. Therefore, during boiling or evaporation, the liquid composition changes only minimally or to a negligible extent, if it changes at all. In contrast, the liquid composition of a non-azeotrope-like composition changes to a substantial degree during boiling or evaporation. According to this invention, an azeotrope-like or pseudo-azeotrope composition includes all ratios of the azeotropic components that boil within one Centigrade degree of the minimum boiling point at 760 Torr (101.1 kPa).

One volatile methyl siloxane (VMS) used to form the azeotropes of the present invention, is a linear short chain siloxane fluid known as hexamethyldisiloxane, which has the formula $(CH_3)_3SiOSi(CH_3)3$. Hexamethyldisiloxane has a viscosity of 0.65 centistoke ($mm^2/s$) measured at 25° Centigrade. Hexamethyldisiloxane is sometimes referred to in the literature as "MM". This shorthand notation indicates the presence in the molecule of two monofunctional "M" units $(CH_3)_3SiO^{1/2}$.

Another volatile methyl siloxane (VMS) used to form the azeotropes of the present invention, is also a linear short chain siloxane fluid known as octamethyltrisiloxane, which has the formula $(CH_3)_3SiO\ (CH_3)_2SiOSi\ (CH_3)_3$. Octamethyltrisiloxane has a viscosity of 1.0 centistoke ($mm^2/s$) measured at 25° Centigrade. Octamethyltrisiloxane is sometimes referred to in the literature as "MDM". This shorthand notation indicates the presence in the molecule of one difunctional "D" unit $(CH_3)_2SiO_{2/2}$ and two monofunctional "M" units $(CH_3)_3SiO_{1/2}$, as shown below.

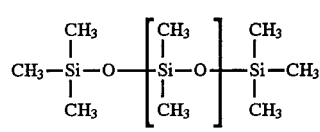

Hexamethyldisiloxane (MM) and octamethyltrisiloxane (MDM) are clear fluids, essentially odorless, nontoxic, non-greasy, non-stinging, and are nonirritating to skin. Each will leave substantially no residue after thirty minutes at room temperature, when one gram of fluid is placed at the center of No. 1 circular filter paper, with a diameter of 185 millimeters and supported at its perimeter in open room atmosphere.

In one prior copending U.S. patent application Ser. No. 08/260,423, filed Jun. 15, 1994, there is described binary azeotropes of hexamethyldisiloxane with the alcohols 3-methyl-3pentanol, 2-pentanol, and 1-methoxy-2-propanol. These compositions are azeotropic at a temperature within the range of 12 to 108 degrees Centigrade inclusive. In a second prior copending U.S. patent application Ser. No. 08/289,360, filed Aug. 11, 1994, there is described binary azeotropes of octamethyltrisiloxane with the alcohols 2-methyl-1-pentanol, 1hexanol, 1-butoxy-2-propanol, or with the ester ethyl lactate. These compositions are azeotropic at a temperature within the range of zero to 162 degrees Centigrade inclusive. In a third prior copending U.S. patent application Ser. No. 08/306,293, filed Sep. 15, 1994, there is described binary azeotropes of octamethyltrisiloxane with the alcohol n-propoxypropanol. These compositions are azeotropic at a temperature within the range of zero to 148 degrees Centigrade inclusive. Reference may be had to these three prior copending applications for details on the preparation of these volatile methyl siloxane containing azeotropes. All three of the applications are assigned to the same assignee as the present invention.

The boiling point of the liquids in degrees Centigrade measured at standard barometric pressure of 760 millimeters of mercury (101.3 kPa) are 100.5° for hexamethyldisiloxane; 152.6° for octamethyltrisiloxane 122° for 3-methyl-3-pentanol 119° for 2-pentanol; 120° for 1-methoxy-2-propanol; 148° for 2-methyl-1pentanol; 157.2° for 1-hexanol 170° for 1-butoxy-2-propanol; 154° for ethyl lactate and 149.8° for n-propoxypropanol.

An especially significant, surprising, and unexpected result flowing from the use of the azeotropes of the invention, is that they possess an enhanced solvency power compared to hexamethyldisiloxane or octamethyltrisiloxane alone. Yet, these azeotropes exhibit a mild solvency power making them useful for rinsing delicate surfaces without doing harm to the surface being rinsed.

The azeotropes are homogeneous in that they have a single liquid phase at both the azeotropic temperature and also at room temperature. Homogeneous azeotropes are more desirable than heterogeneous azeotropes, especially for rinsing applications, because homogeneous azeotropes exist as one liquid phase instead of two phases as the heterogeneous azeotrope. Each phase of a heterogeneous azeotrope differs in its rinsing power. Therefore the rinsing performance of a heterogeneous azeotrope will be difficult to reproduce because it is dependent upon consistent mixing of the phases. Single phase (homogeneous) azeotropes are also more useful than multi-phase (heterogeneous) azeotropes, since they can be transferred between locations with more facility.

The azeotropic composition of the invention are useful for rinsing general machine parts such as gear boxes, as well as electro-mechanical parts such a electric motors. However, the compositions are particularly useful for rinsing precision articles made of metal, ceramic, glass, and plastic. Examples of such articles are electronic and semiconductor parts, electric and precision machinery parts such as ball bearings, optical parts and components such as lenses, photographic and camera parts and equipment, and military and space hardware such as precision guidance equipment used in the defense and aerospace industries.

One especially useful application of the azeotropic compositions of the invention is in the removal of fluxes used in mounting and soldering electronic parts on printed circuit boards. For example, a solder is often used in making a mechanical, electro-mechanical, or electronic connection. Thus, in making electronic connections, the components are attached to the conductor paths of a printed wiring assembly by wave soldering. The solder used is usually a tin-lead alloy, with the aid of a flux which is rosin based. Rosin is a complex mixture of isomeric acids principally abietic acid. These rosin fluxes often also contain activators such as amine hydro-halides and organic acids. The function of the flux is to react with and remove surface compounds such as oxides. It also reduces the surface tension of the molten solder alloy, and prevents oxidation during the heating cycle by providing a surface blanket to the base metal and solder alloy.

After the soldering operation, however, it is usually necessary to perform a final washing of the assembly. The azeotropic compositions of the invention are useful as a final rinse. They remove any flux residues and oxides formed on areas unprotected by the flux during moldering which are corrosive or would cause malfunctioning or short circuiting of electronic assemblies. In such applications, the azeotropic compositions can be used in conjunction with cold cleaners, vapor degreasers, or accompanied with ultrasonic energy.

The azeotropic compositions of this invention can also be used in conjunction with the removal of carbonaceous materials from the surface of such articles, as well as from the surface of various other industrial articles. Exemplary of carbonaceous materials are any carbon containing compound or mixtures of carbon containing compounds, which are soluble in one or more of the common organic solvents, such as hexane, toluene, or 1,1,1trichloroethane.

These azeotropes have several advantages for rinsing. Thus, the azeotropic composition can easily be regenerated by distillation so that the performance of the rinsing mixture can be restored after a period of use. The performance factors which can be affected by the composition of azeotropic mixtures include bath life, rinsing speed, lack of flammability when only one component is non-flammable, and lack of damage to sensitive parts.

In vapor phase rinsing equipment, the azeotropic mixture can be continually restored by continuous distillation at atmospheric or at reduced pressure, and can be continually recycled in the rinsing equipment. In this type of equipment, rinsing can be conducted at the boiling point by plunging the part to be rinsed in the boiling liquid, or by allowing the refluxing vapor to condense on the cold part. Alternatively, the part may be immersed in a cooler bath that is continually fed by fresh condensate, and the dirty overflow liquid is returned to a boil If the azeotrope is used in an open system, the composition and the performance of the azeotrope will remain constant even though evaporative losses occur. Such a system can be operated at room temperature when used in an ambient rinsing bath, or when used as a wipe-on-by-hand rinse. The rinsing bath can also be operated at elevated temperatures which are below the boiling point, although rinsing often occurs faster at an elevated temperature, and hence is desirable when the part to be rinsed and the equipment permit.

The azeotropes of the invention can be used for rinsing in a variety of ways beyond those shown by the foregoing examples. Thus, rinsing can be conducted by using a given azeotrope at or near its azeotropic temperature or at some other temperature.

Other processes of use of the azeotropes of the invention include the distillative recycle of a spent azeotrope at atmospheric pressure, or at a reduced pressure. In addition, rinsing may be conducted by immersing the part to be rinsed in quiescent or boiling liquid, as well as in the vapor condensation region above the boiling liquid. In the later case, the part is rinsed in a continually renewed liquid of maximum rinsing power.

In rinsing applications according to the invention, only the azeotrope may be used, however if desired, small amounts of one or more organic liquid additives can be combined with the azeotrope. Organic liquid additives contemplated according to the invention, are compounds capable of imparting oxidative stability, corrosion inhibition, or solvency enhancement.

Oxidative stabilizers inhibit the slow oxidation of organic compounds such as alcohols. Corrosion inhibitors inhibit metal corrosion by traces of acids that may be present, or which slowly form in alcohols. Solvency enhancers increase solvency power by adding more powerful solvents to a starting solvent. These additives can mitigate any undesired effects of the alcohol component of the azeotropes of the invention, since the alcohol component is not as resistant to oxidative degradation as hexamethyldisiloxane or octamethyltrisiloxane.

Numerous additives are suitable for combination with the azeotropes of the invention, and both hexamethyldisiloxane and octamethyltrisiloxane are miscible with small amounts of many such additives. However, regardless of the additive, it must be one in which the resulting liquid mixture of the selected additive and the azeotrope is homogeneous and single phased.

Among the oxidative stabilizers that may be employed in amounts of about 0.05 to 5 percent by weight, are phenols such as trimethylphenol, cyclohexylphenol, thymol, 2,6-di-t-butyl-4methylphenol, butylhydroxyanisole, and isoeugenol; amines such as hexylamine, pentylamine, dipropylamine, diisopropylamine, diisobutylamine, triethylamine, tributylamine, pyridine, N-methylmorpholine, cyclohexylamine, 2,2,6,6-tetramethylpiperidine, and N,N'-diallyl-p-phenylenediamine and triazoles such as benzotriazole, 2-(2'-hydroxy-5,-methylphenyl)benzotriazole, and chlorobenzotriazole.

Among the corrosion inhibitors that may be employed in amounts of about 0.1 to 5 percent by weight, are aliphatic nitro compounds such as nitromethane, nitroethane, and nitropropane acetylene alcohols such as 3-methyl-1-butene-3-ol, and 3-methyl-1-pentene-3-ol epoxides such as glycidol, methyl glycidyl ether, allyl glycidyl ether, phenyl glycidyl ether, 1,2-butylene oxide, cyclohexene oxide, and epichlorohydrin ethers such as dimethoxymethane, 1,2-dimethoxyethane, 1,4-dioxane, and 1,3,5-trioxane; unsaturated hydrocarbons such as hexene, heptene, octene, 2,4,4-trimethyl-1-pentene, pentadiene, octadiene, cyclohexene, and cyclopentene olefin based alcohols such as allyl alcohol, and 1-butene-3-ol; and acrylic acid esters such as methyl acrylate, ethyl acrylate, and butyl acrylate.

Among the solvency enhancers that may be employed in amounts of about 0.1 to 10 percent by weight, are hydrocarbons such as pentane, isopentane, hexane, isohexane, and heptane; nitroalkanes such as nitromethane, nitroethane, and nitropropane; amines such as diethylamine, triethylamine, isopropylamine, butylamine, and isobutylamine; alcohols such as methanol, ethanol, n-propyl alcohol, isopropyl alcohol, n-butanol, and isobutanol; ethers such as methyl Cellosolve®, tetrahydrofuran, and 1,4-dioxane; ketones such as acetone, methyl ethyl ketone, and methyl butyl ketone; and esters such as ethyl acetate, propyl acetate, and butyl acetate.

In the process for cleaning or dewatering a surface, there is applied to the surface a watching composition which is a mixture containing a VMS such as hexamethyldisiloxane or octamethyltrisiloxane, and an agent for enhancing cleaning or dewatering. The cleaning agent enhancer for use in cleaning applications is a glycol ether. The dewatering agent enhancer for dewatering applications is a surface active agent.

Other enhancers can also be employed, if desired, such as non-volatile organic compounds which dissolve completely in the volatile methyl siloxane, and which bear at least one hydroxyl, ether, or carbonyl group in the molecule.

In the case of cleaning applications, the mixture used as the washing composition contains 30 to 99 percent by weight of VMS and 1 to 70 percent by weight of the cleaning agent enhancer. In the case of dewatering applications, the mixture used as the washing composition contains 90 to 99.995 percent by weight of VMS and 0.005 to 10 percent by weight of the surface active agent.

Suitable glycol ethers are commercially available and sold by The Dow Chemical Company, Midland, Mich., USA, under their trademark DOWANOL®. Representative glycol ethers are propylene glycol methyl ether, dipropylene glycol methyl ether, tripropylene glycol methyl ether, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, diethylene glycol methyl ether, triethylene glycol methyl ether, ethylene glycol n-butyl ether, diethylene glycol n-butyl ether, triethylene glycol n-butyl ether, and ethylene glycol phenyl ether. Most preferred of the glycol ethers are propylene glycol phenyl ether and tripropylene glycol methyl ether.

The surface active agent may be an ionic emulsifier such as an anionic, amphoteric (ampholytic), or cationic emulsifying agent a nonionic emulsifier or a mixture of emulsifying agents. Where mixtures of anionic and cationic surfactants are employed, some or all of the inorganic counterions may be removed. Most preferred according to the invention, however, are nonionic or amphoteric surface active agents.

One type of nonionic surfactant most preferred for this invention is an ethoxylated fatty alcohol, although other types of nonionic emulsifiers can be employed. Such fatty alcohol ethoxylates contain in their molecule the characteristic group —$(OCH_2CH_2)_aOH$, which is attached to a fatty hydrocarbon residue of about eight to twenty carbon atoms, such as lauryl ($C_{12}$), cetyl ($C_{16}$) and oleyl or stearyl ($C_{18}$). The integer "a" can have a value of one to about one hundred, but typically has a value of about 12 to 40.

Examples of commercial products found to be suitable according to the present invention, include the various polyoxyethylene fatty alcohols sold under the tradename BRIJ by ICI Surfactants of Wilmington, Del.; the tradename EMERY by the Henkel Corporation/Emery Group, of Ambler, Pa.; the trademark ETHOSPERSE® by Lonza Incorporated, of Fairlawn, N.J.; and the trademark PROMULGEN® by the Amerchol Corporation, of Edison, N.J.

A particularly preferred nonionic surfactant is BRIJ 93 Liquid. This polyoxyethylene (2) oleyl ether has an HLB value of about 4.9 and a structure corresponding to the formula $CH_3(CH_2)_7CH=CH(CH_2)_7CH_2(OCH_2CH_2)_2OH$. Oleth-2 is the International Nomenclature Cosmetic Ingredient: (INCI) name assigned by The Cosmetic, Toiletry, and Fragrance Association, Washington, D.C., (CTFA) to polyoxyethylene (2) oleyl ether. Oleth-2 is also sold under the trademark AMEROXOL® OE-2 by the Amerchol Corporation, of Edison, N.J.

Other polyoxyethylene fatty alcohols which can be employed in accordance with the concepts of the present invention are polyoxyethylene (4) lauryl ether, polyoxyethylene (2) cetyl S ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (10) oleyl ether, and polyoxyethylene (20) oleyl ether.

Other suitable nonionic surfactants which are either ethoxylated alcohols or ethoxylated alkyl phenols are sold under the trademarks TERGITOL® and TRITON® by Union Carbide Corporation, Danbury, Conn.; NEODOL® by Shell Chemical Company, Houston, Tex.; MACOL® by PPG Industries, Gurnee, Ill.; and under the tradenames TRYCOL by Henkel Corporation, Ambler, Pa.; and BRIJ by ICI Americas Incorporated, Wilmington, Del.

In addition, some other types of nonionic surfactants which can be used are fatty acid alkanolamides or amine oxides. The fatty acid alkanolamides are nonionic surfactants obtained by reacting alkanolamines such as monoethanolamine, diethanolamine, monoisopropanolamine, or diisopropanolamine, with a fatty acid or fatty acid ester to form the amide. The hydrophobic portion of the nonionic surfactant is provided by a fatty acid hydrocarbon chain which generally has from ten to twenty-one carbon atoms. The fatty acid alkanolamide surfactants include fatty acid diethanolamides such as isostearic acid diethanolamide, lactic acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide. Representative of a suitable such nonionic surfactant is a product sold under the trademark WITCAMIDE® by Witco Corporation, New York, N.Y.

The amine oxides are nonionic surfactants obtained by oxidizing a tertiary amine to form the amine oxide. Amine oxide surfactants include the N-alkyl amine oxides such as N-cocodimethylamine oxide, N-lauryl dimethylamine oxide, N-myristyl dimethylamine oxide, and N-stearyl dimethylamine oxide the N-acyl amine oxides such as N-cocamidopropyl dimethylamine oxide and N-tallowamidopropyl dimethylamine oxide and N-alkoxyalkyl amine oxides such as bis(2-hydroxyethyl) C12–15 alkoxypropylamine oxide. The hydrophobic portion of the amine oxide surfactants is generally provided by a fatty hydrocarbon chain containing from ten to twenty-one carbon atoms.

Representative amine oxide surfactants include lauric acid diethanolamide, N-lauryl dimethylamine oxide, coconut acid diethanolamide, myristic acid diethanolamide, and oleic acid diethanolamide. Suitable commercial materials are those products sold under tradenames and trademarks such as AMMONYX by the Stephan Company, Northfield, Ill.; BARLOX® by Lonza Incorporated, Fairlawn, N.J.; and MACKAMINE by The McIntyre Group Limited, University Park, Ill.

Sorbitan derivatives sold under the tradenames SPAN and MEN by ICI Americas Incorporated, Wilmington, Del.; and propylene oxide-ethylene oxide block polymers sold under the trademark PLURONIC® by BASF Corporation, Parsippany, N.J.; may also be employed.

The washing composition used in dewatering applications can contain an ionic surfactant or mixture of ionic surfactants, in addition to the nonionic surfactant. Where mixtures of anionic and cationic surfactants are employed, some or all of the inorganic counterions may be removed. Suitable anionic surfactants include sulfonated and sulfated alkyl, aralkyl and alkaryl anionic surfactants; alkyl succinates; alkyl sulfosuccinates and N-alkyl sarcosinates. Representative surfactants are the acid forms as well as the sodium, magnesium, ammonium, and the mono-, di- and triethanolamine salts of alkyl and aralkyl sulfates, in addition to the salts of alkaryl sulfonates. The alkyl groups of the surfactants generally have a total of from about twelve to twenty-one carbon atoms, may be unsaturated, and are preferably fatty alkyl groups. The sulfates may be sulfate ethers containing one to ten ethylene oxide or propylene oxide units per molecule. Preferably, the sulfate ethers contain two to three ethylene oxide units.

In addition, alkyl dithiocarbamates; fatty acid salts; alkyl, aryl, and pyrimidal mercaptyl salts; alkyl phosphonates; and alkyl phosphate salts and acids; can also be employed.

Representative anionic surfactants include sodium lauryl sulfate, sodium lauryl ether sulfate, ammonium lauryl sulfate, triethanolamine lauryl sulfate, sodium C14–16 olefin sulfonate, ammonium pareth-25 sulfate, sodium myristyl ether sulfate, ammonium lauryl ether sulfate, disodium monooleamidosulfosuccinate, ammonium lauryl sulfosuccinate, sodium dodecylbenzene sulfonate, triethanolamine dodecylbenzene sulfonate, and sodium N-lauroyl sarcosinate.

Suitable anionic surfactant products are sold under tradenames or trademarks such as EMCOL® and WITCONATE® by Witco Corporation, New York, N.Y.; MARLON by Huls America Incorporated Piscataway, N.J.; AEROSOL by American Cyanamid Company, Wayne, N.J.; and HAMPOSYL by W. R. Grace & Company, Lexington, Mass. There may also be employed sulfates of ethoxylated alcohols sold under the tradename STANDAPOL by Henkel Corporation, Ambler, Pa.

Surfactants classified as amphoteric or ampholytic include cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine. Other suitable amphoteric surfactants include the quaternary cycloimidates, betaines, and sultaines.

The betaines have the structure $R^1R^2R^3N^+(CH_{2m}COO^-$ in which $R^1$ is an alkyl group having about twelve to eighteen carbon atoms or a mixture thereof; $R^2$ and $R^3$ are independently lower alkyl groups having one to three carbon atoms; and m is an integer having a value of from one to four. Specific betaines are alpha-(tetradecyldimethylammonio) acetate, beta-(hexadecyldiethylammonio)propionate, and gamma-(dodecyldimethylammonio)butyrate.

The sultaines have the structure $R^1R^2R^3N^+(CH_{2m}SO_3$ in which $R^1$, $R^2$ $R^3$ and m, are as defined above. Specific useful sultaines are 3-(dodecyldimethylammonio)-propane-1-sulfonate, and 3-(tetradecyldimethylammonio)ethane-1-sulfonate.

Representative amphoteric surfactants are products sold under tradenames or trademarks such as MIRATAINE® by Rhone-Poulenc Incorporated, Cranberry, N.J.; and TEGO BETAINE by Goldschmidt Chemical Corporation, Hopewell, Va. Imidazoline and imidazoline derivatives sold under the trademark MIRANOL® by Rhone-Poulenc Incorporated, Cranberry, N.J., may also be employed.

Cationic surfactants which are useful in the invention include compounds which contain amino or quaternary ammonium hydrophilic moieties in the molecule and which are positively charged, such as quaternary ammonium salts. Representative quaternary ammonium salts which may be employed are ditallowdimethyl ammonium chloride, ditallowdimethyl ammonium methyl sulfate, dihexadecyl dimethyl ammonium chloride, di(hydrogenated tallow) dimethyl ammonium chloride, dioctadecyl dimethyl ammonium chloride, dieicosyl dimethyl ammonium chloride, didocosyl dimethyl ammonium chloride, di(hydrogenated tallow) dimethyl ammonium acetate, dihexadecyl dimethyl ammonium acetate, ditallow dipropyl ammonium phosphate, ditallow dimethyl ammonium nitrate, di(coconutalkyl) dimethyl ammonium chloride, and stearyl dimethyl benzyl ammonium chloride.

Suitable cationic surfactants are sold under tradenames or trademarks such as ADOGEN by Sherex Chemical Company Incorporated, Dublin, Ohio EMCOL® by Witco Corporation, New York, N. Y. TOMAH by Tomah Products Incorporated, Milton, Wisconsin and ARQUAD and ETHOQUAD by Akzo Chemicals Incorporated, Chicago, Ill.

Instead of using an organic surface active agent, a siloxane surfactant can be employed. One suitable siloxane surfactant is a silicone glycol as described in U.S. Pat. No. 4933002. This surfactant is a trisiloxane having in its molecule an acyloxy terminated glycol chain. More specifically, the glycol chain is connected to silicon with an alkylene linking radical —(CH$_2$)$_n$—, and the glycol chain is terminated by the acetoxy radical —OC(O)CH$_3$. This surfactant behaves similarly to other similar siloxane surfactants where them glycol chain is terminated by hydroxy or methoxy radicals. This surfactant is referred to hereinafter and in Tables I and II as "SILSUR".

Non-aqueous washing processes involve three sequential steps using non-aqueous liquid agents. In a first washing step, a washing agent is used which is effective at displacing or dissolving the soil from the article to be washed. In a second rinsing step, a rinsing agent is used which removes the soil contained in the residual washing agent that is carried over from the first cleaning step. In a third drying step, the rinsing agent is removed from the article by evaporation. Removal of residual washing agent from the article is important because it contains soils in suspension or in solution. Thus, the rinse step often employs fresh washing agent to promote thorough removal of the soil.

The washing agent used for cleaning soils from parts or for the displacement of solid particles or liquids such as water, from parts is often a mixture of a base fluid and a non-volatile additive, in which the base fluid is a volatile methyl siloxane (VMS) or a volatile saturated hydrocarbon. The non-volatile additive is selected to increase the mild or low solvency or water displacement power of the base fluid. In some cases, the non-volatile additive can be selected such that it is also a volatile material, but for most applications, the available volatile additives do not properly remove the soil, so that a non-volatile additive must be used.

Thus, cleaning or water displacement processes employ a wash or water displacement action followed by a rinse step that removes a non-volatile additive. The rinse step typically uses a straight base fluid since it can be a good solvent for a non-volatile additive and is totally volatile.

The use of a volatile methyl siloxane (VMS) azeotrope for the rinse step, following the use of a washing agent is not believed to he known previous to this invention. It has unexpectedly been discovered that the use of an azeotrope of a volatile methyl siloxane and certain volatile solvency enhancers in the rinse step provides advantages over the use of only a volatile methyl siloxane in the rinse.

Tests were conducted using azeotropes containing various alcohols and hexamethyldisiloxane or octamethyltrisiloxane for rinsing two different rosin flux cleaners. One washing composition contained 10 weight percent of dibutyl succinate (DBS) in octamethyltrisiloxane, while the other washing composition contained 2.5 weight percent "SILSUR" in hexamethyldisiloxane.

Both washing compositions were effective in removing a Kester 1544 flux from Q panels, but left some non-volatile additive on the panel which interfered with its subsequent use. Rinsing with only hexamethyldisiloxane, or with only octamethyltrisiloxane removed some of the additive, but the process with only the volatile methyl siloxanes was slow. However, it was discovered quite unexpectedly, that rinsing with either of the aforementioned azeotropes, removed the additive much more quickly.

Similarly, and during water displacement experiments, it was found that rinsing with any one of three different azeotropes after the water displacement step, removed the water displacement fluid much more thoroughly from the part than did rinsing with only hexamethyldisiloxane or octamethyltrisiloxane. The water displacement fluid contained hexamethyldisiloxane or octamethyltrisiloxane and a minor amount of a surfactant to promote water displacement from the article. Residual surfactant was more thoroughly removed from the article by rinsing with an azeotrope according to the invention.

While not being bound by any particular theory, it is believed that the key requirements of any two-step process are that the alcohol be miscible in the amount used with the volatile methyl siloxane (VMS) and that the resulting mixture be volatile. This is based on the premise that in the first instance, the presence of an alcohol dissolved in a non-polar solvent such as VMS provides increased solvency for polar or semi-polar compounds. In the second instance, the additive in washing or dewatering applications must also be polar or semipolar for the same reasons.

In these applications, azeotropic compositions provide the benefit of distillative recycle "in situ" to prevent the build-up of the additive in the rinse bath. Azeotropes can easily be regenerated by distillation with no change in their composition, so that the performance of the mixture can be restored after a period of use. Performance factors which can be affected by the ratio of components in these mixtures include bath life, washing or rinsing speed, lack of flammability when only one component is non-flammable, and lack of damage to sensitive parts. Compositions which are azeotropic at room temperature but not at the normal boiling point provide the benefit that their solvency power is unchanged after evaporative losses at room temperature. Such losses occur during use in an open system.

CLEANING APPLICATIONS

Washing compositions containing "SILSUR" in hexamethyldisiloxane, and dibutyl succinate (DBS) in octamethyltrisiloxane, were found effective in removing rosin-based solder flux from substrates. Both of these cleaning agent enhancers are considerably more polar than a volatile methyl siloxane such as hexamethyldisiloxane (MM), and hence they increase the solvency power of polar substances such as rosin-based solder flux. However, the use of such washing compositions is complicated by the fact that the additives are not volatile in the time scale of a washing process. Hence, thorough rinsing is needed to remove the non-volatile additive dissolved in the film of the washing composition that clings to a part.

Two azeotropes were used as rinse agents, and each azeotrope contained an alcohol and either hexamethyldisiloxane or octamethyltrisiloxane. The performance of these two azeotropic rinse agents to remove a non-volatile additive was compared to that of using only hexamethyldisiloxane or only octamethyltrisiloxane. This data is shown below in Table I.

In compiling this data, the removal of solder flux from a coated panel was measured by weight loss. Table I shows that both washing compositions were effective in removing the solder flux. However, some non-volatile additive was deposited on the panel and remained after cleaning. This was revealed because an uncoated panel showed a weight gain after exposure to fresh washing composition. On the coated panels themselves, the weight loss due to removal of flux concealed the weight gain due to deposition of the additive. However, data on the uncoated panels clearly showed that the additive was rapidly removed by the rinse agent.

It can be seen in Table I that the use of only the volatile methyl siloxane as a rinse agent was much more sluggish in the removal of the non-volatile additive. In contrast, a more rapid removal by using the azeotropic form of rinsing agent provides the benefit of faster through-put in the washing process.

TABLE I

| CLEANING AGENT | INITIAL FLUX WEIGHT grams | WEIGHT CHANGE BY CLEANING grams | RINSE AGENT | WEIGHT CHANGE BY RINSING grams |
| --- | --- | --- | --- | --- |
| 10% DBS in MDM | 0.4349 | ND | AZEO A | −0.1951 |
| 10% DBS in MDM | 0.3958 | ND | AZEO B | −0.2986 |
| 10% DBS in MDM | NOCOAT | +0.0086 | AZEO A | −0.0090 |
| 10% DBS in MDM | NOCOAT | +0.0045 | AZEO B | −0.0045 |
| 10% DBS in MDM | 0.3249 | ND | MDM | −0.0067 |
| 10% DBS in MDM | 0.3208 | ND | MM | −0.0032 |
| 10% DBS in MDM | NOCOAT | +0.0089 | MDM | −0.0089 |
| 2.5% SILSUR/MM | 0.4387 | ND | AZEO B | −0.3357 |
| 2.5% SILSUR/MM | 0.4395 | ND | AZEO A | −0.2712 |
| 2.5% SILSUR/MM | NOCOAT | +0.0161 | AZEO B | −0.0153 |
| 2.5% SILSUR/MM | NOCOAT | +0.0248 | AZEO A | −0.0238 |
| 2.5% SILSUR/MM | 0.3043 | ND | MM | −0.0844 |
| 2.5% SILSUR/MM | 0.2892 | ND | MDM | −0.0942 |
| 2.5% SILSUR/MM | NOCOAT | +0.0215 | MDM | −0.0101 |
| 2.5% SILSUR/MM | NOCOAT | +0.0129 | MM | −0.0074 |

In Table I, the samples ere washed for ten minutes and rinsed for thirty seconds with each of the specified azeotropes A or B. The samples were dried with an air knife followed by oven drying at 80° C. for ten minutes and weighed. Azeotrope A ("AZEO A") contained 13 weight percent of 2-methyl-1-pentanol in octamethyltrisiloxane. Azeotrope B ("AZEO B") contained 18 weight percent of 1-methoxy-2-propanol in hexamethyldisiloxane.

The following abbreviations are used in Table I. "ND" means that specific data was not determined. "NOCOAT" indicates an uncoated surface which was a CONTROL experiment. "SILSUR", as explained above, indicates the acetoxy-terminated silicone glycol nonionic surfactant. "MM" indicates the VMS hexamethyldisiloxane. "MDM" indicates the VMS octamethyltrisiloxane. "DBS" is dibutyl succinate which is a diester of butyl alcohol and succinic acid. "DBS" has the formula $CH_3(CH_2)_3OOCCH_2CH_2COO(CH_2)_3CH$. The procedure used to compile the data in Table I is shown below.

EXAMPLE I

Kester No. 1544 rosin flux was mixed with 0.05 weight percent of a nonreactive low viscosity silicone glycol flow-out additive. The mixture was applied as a uniform thin layer to a 2"×3" (5.1×7.6 cm) area of an Aluminum Q panel with a No. 36 Industry Tech Inc. draw-down rod. An activated rosin-based solder flux commonly used for electrical and electronic assemblies was employed. The flux was a product manufactured and sold by Kester Solder Division, Litton Industries, Des Plaines, Ill., USA. The approximate composition of the flux was fifty weight percent of a modified rosin, twenty-five weight percent of ethanol, twenty-five weight percent of 2-butanol, and one weight percent of a proprietary activator. The coating was allowed to dry at room temperature and cured at 100° C. for ten minutes in an air oven. The Aluminum Q panel was placed in a large beaker which had a magnetic stirring bar at the bottom and one-third filled with the azeotropic composition. Washing was conducted while rapidly stirring at room temperature, even when washing with the higher temperature azeotropic compositions. The panel was removed at timed intervals, dried at 80° C. for ten minutes, weighed, and reimmersed for additional washing. The initial coating weight and the weight loss were measured as a function of cumulative cleaning time, and this data is shown above in Table I.

DEWATERING APPLICATIONS

Water displacement is defined as the transport of liquid water from a water-wet article to a liquid medium to form a suspension rather than a solution. Such displacement is an efficient way to remove water and ionic impurities from articles that have been passed through aqueous coating or washing operations. The separation of suspended water from this liquid medium in order to regenerate renewed activity is much easier than separation of water from its solution. Water displacement agents (WDA) are water-immiscible liquids which contain a small amount of a surfactant. The surfactant is believed to function in the reduction of the interfacial tension between the water and the suspending liquid in order to facilitate displacement of water from the article.

Typically, the surfactant is non-volatile, and in those instances traces of the surfactant on the article after water displacement often must be removed. Accordingly, the article is rinsed with a totally volatile liquid in which the surfactant is soluble. This rinse liquid is typically the same as the base liquid used in the water displacement agent (WDA).

Effective water displacement agents remove most or all of the water from the article during the displacement step. However, an effective water displacement process is also judged by whether the displacement and rinse agents used in the process require frequent replacement, and whether the non-volatile surfactant is thoroughly removed from the article during the rinse step.

According to the present invention, however, it has been discovered that the use of azeotropes containing volatile methyl siloxanes and alcohols, rather than only a volatile methyl siloxane as a rinsing agent, provides less loss of rinsing agent during the process. Additional benefits of the invention are that there is provided a more complete removal of the surfactant from the article, as well as a more complete removal of water.

In experiments illustrating this dewatering aspect of the present invention, a metal screen was (i) immersed in a dilute solution of sodium nitrate in water, (ii) removed, (iii) immersed in a water displacement agent (WDA) and gently agitated, (iv) removed, (v) immersed in a rinse agent and gently agitated, and (vi) removed. In order to measure any fluid and water carryover, the screen was quickly immersed in deionized water and strongly agitated. The sodium nitrate provided a route for the assay of water displacement, and was representative of the presence of any ionic impurities in the water. The amount of salty water carried over into the deionized water was determined by conductivity measurements. The amount of water-immiscible liquid carried over into the deionized water was determined by measurement of its volume as a supernatant layer above the deionized water.

Agitation may be applied by stirring the fluid, by pumping the fluid around in a vessel, or by ultrasonic agitation.

complete removal of the water-immiscible liquid, which contained some variable amount of water, since neither mixtures of surfactant and volatile methyl siloxane, nor mixtures of water and volatile methyl siloxane, appear milky at the surfactant concentrations employed in the experiments.

TABLE II

| WATER DISPLACER | RINSE AGENT | SALTY WATER CARRYOVER GRAMS | NON-AQUEOUS CARRYOVER INTO EXTRACTION WATER (ml) |
| --- | --- | --- | --- |
| NONE | NONE | 1.2 | None detected. |
| MM | MM | 0.29 | less than 0.25 mls of discrete drops of clear fluid rose to top of the water extract. |
| 0.2% SILSUR/MM | MM | 0.024 | 2.5 mls of milky fluid rose to the top of the $H_2O$ extract. |
| 0.2% SILSUR/MM | AZEO A | 0.016 | 1.0 mls of milky fluid rose to the top of the water extract. |
| 0.2% SILSUR/MM | AZEO B | 0.015 | less than 0.5 mls of milky fluid rose to top of the $H_2O$ extract. |
| 0.2% SILSUR/MM | AZEO C | 0.013 | less than 0.25 mls milky fluid rose to top of the $H_2O$ extract. |
| 0.2% BRIJ93/MDM | MDM | 0.022 | 3.0 mls of milky fluid rose to the top of the $H_2O$ extract. |
| 0.2% BRIJ93/MDM | AZEO A | 0.022 | 0.5 mls of milky fluid rose to the top of the $H_2O$ extract. |
| 0.2% BRIJ93/MDM | AZEO B | 0.016 | less than 0.5 mls milky fluid rose to top of the $H_2O$ extract. |
| 0.2% BRIJ93/MDM | AZEO C | 0.003 | less than 0.25 mls milky fluid rose to top of the $H_2O$ extract. |

Two water displacement agents were employed in the course of these experiments. Both water displacement agents were dilute solutions of a nonionic surfactant in a volatile methyl siloxane. One nonionic surfactant was a siloxane surfactant, and the other nonionic surfactant was an organic surfactant. The siloxane surfactant was the acetoxy-terminated silicone glycol "SILSUR" referred to above. The organic surfactant was BRIJ 93 Liquid sold by ICI Surfactants of Wilmington, Del. Chemically, Brij 93 Liquid is polyoxyethylene (2) oleyl ether and it has an HLB value of about 4.9. The rinse agents used to remove the non-volatile additive were either a volatile methyl siloxane alone, or an azeotrope containing a volatile methyl siloxane and an alcohol. The water displacement agents and the rinse agents were immiscible in and less dense than water.

The results of these experiments are shown below in Table II. As a control, hexamethyldisiloxane alone was used as a water displacement agent. The data reveals that hexamethyldisiloxane alone was not fully effective at displacing water. Those water displacement agents which contained a surfactant were found to be much more effective. However, in rinsing those agents with a straight VMS fluid, there was a significant carryover of water-immiscible fluid into the deionized water.

It should be noted that rinsing with any of the azeotropic mixtures according to the invention dramatically reduced the amount of water-immiscible liquid carried into the deionized water. This reduction provided less loss of the rinse agent during the overall water displacement process. Furthermore, the non-aqueous liquid that is carried over contained some non-volatile surfactant since the supernatant liquid had a milky appearance, whereas suspensions of volatile methyl siloxanes and water are clear. Hence, a more complete rinsing of the non-volatile additive from the part was obtained when rinsing was conducted using the azeotropes. The salty water carry-over was also less when the azeotropes were used for rinsing. It is believed that this is due to a more In Table II, the following abbreviations were used. "SIL-SUR" is the acetoxy-terminated silicone glycol nonionic surfactant noted above. "AZEO A" is an azeotrope according to the invention containing 7 percent by weight of 3-methyl-3-pentanol in hexamethyldisiloxane. "AZEO B" is an azeotrope according to the invention containing 13 percent by weight of 2-methyl-1-pentanol in octamethyltrisiloxane. "AZEO C" is an azeotrope according to the invention containing 13 percent by weight of 2-pentanol in hexamethyldisiloxane. "MDM" indicates the VMS octamethyltrisiloxane. "MM" indicates the VMS hexamethyldisiloxane.

The procedure used in compiling the data in Table II was a test to assay for the amount of salty water retained in a wire screen by capillary forces, after the screen had been subjected to a water displacement process. In the water displacement process, the screen was successively loaded with salty water, subjected to water displacement, rinsed in a non-aqueous liquid to remove the non-volatile additive, and extracted with deionized water to extract the salt content. The amount of salty water carryover was determined by measuring the conductivity of the water extracted. The conductivity was converted to weight of carried over water from the known concentration of salt in the starting salty water, and from the initial weight of the deionized water. The amount of non-aqueous liquid carried over to the water extract was determined by measuring the volume of supernatant liquid in the water extract. This process employed four graduated cylinders containing four different liquids. The liquids were salty water, the water displacement agent (WDA), the rinse agent, and deionized water.

The screen was made of #24 gauge wire which is a 80/20 Nickel/Chromium alloy woven into #16 mesh. The screen was 5 cm by 6.5 cm and the screen weighed five grams. The screen was rolled into tight cylinder and snugly inserted into the end of a transparent tube having an internal diameter of eleven millimeters. Several of these screen assemblies were used for the tests. The screen assemblies were cleaned before each test by soaking in acetone for twenty minutes and then soaking in deionized water for five minutes. According to this test procedure, the screen was first immersed into a 0.1 N solution of sodium nitrate in water and gently removed to load it with salty water. Then the screen was immersed in the water displacement agent (WDA) and moved up and down ten times, taking care not to touch the water layer that had settled to the bottom. The screen was pulled from the liquid at the end of each up stroke and allowed to drain into the water displacement agent fluid. During each up stroke, some water fell from the screen and slowly settled as a flocculent mass at the bottom of the WDA fluid. The flocculent character indicated that a colloidal mixture of volatile methyl siloxane, surfactant, and water, had formed as a separate phase from the bulk water. The speed of settling of the flocs is proportional to their weight percent of water, since water is denser than the base volatile methyl siloxane fluid. There was some variation in the water content of the flocs, since some of the flocs fell rapidly, while others fell very slowly particularly during the final strokes in the WDA fluid. The screen was rinsed by two up and down strokes in the rinse agent. The screen was pulled from the liquid at the end of each up stroke, and allowed to drain into the rinse agent. In the final step in this procedure, the screen was extracted by ten vigorous up and down strokes in the deionized water.

Other variations and modifications may be made in method described herein without departing from the essential features and concepts of the present invention. The form of the invention described herein is exemplary only and is not intended as a limitation on the scope of the invention as defined in the appended claims.

That which is claimed is:

1. A process for cleaning or dewatering a surface which comprises (A) applying to the surface a washing composition comprising a volatile methyl siloxane selected from the group consisting of hexamethyldisiloxane and octamethyltrisiloxane, and an agent for enhancing cleaning or dewatering selected from the group consisting of a non-volatile organic compound bearing at least one hydroxyl, ether, or carbonyl group, and a surface active agent; (B) while the surface is still wet with the washing composition, rinsing the surface with a rinsing composition comprising an azeotrope or an azeotrope-like composition containing as components a volatile methyl siloxane selected from the group consisting of hexamethyldisiloxane and octamethyltrisiloxane, and a compound selected from the group consisting of 2-pentanol, 2-methyl-1-pentanol, 3-methyl-3-pentanol, 1-methoxy-2-propanol, 1-butoxy-2-propanol, 1-hexanol, n-propoxypropanol, and ethyl lactate; and then (C) drying or permitting the surface to dry; the azeotrope being a composition that is azeotropic at a temperature within a range selected from the group consisting of 0°–148° C., 0°–162° C., and 12°–108° C., and including a minimum boiling point at 760 Torr; the azeotrope-like composition being a composition that includes all ratios of components that boil within one Centigrade degree of the minimum boiling point of the azeotrope at 760 Torr.

2. A process according to claim 1 in which the azeotrope or the azeotrope-like composition contains hexamethyldisiloxane and a compound selected from the group consisting of 2-pentanol, 3-methyl-3-pentanol, and 1-methoxy-2-propanol.

3. A process according to claim 1 in which the azeotrope or the azeotrope-like composition contains octamethyltrisiloxane and a compound selected from the group consisting of 2-methyl-1-pentanol, 1-butoxy-2-propanol, 1-hexanol, n-propoxypropanol, and ethyl lactate.

4. A process according to claim 1 in which the washing composition contains a glycol ether selected from the group consisting of propylene glycol methyl ether, dipropylene glycol methyl ether, tripropylene glycol methyl ether, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, diethylene glycol methyl ether, triethylene glycol methyl ether, ethylene glycol n-butyl ether, diethylene glycol n-butyl ether, triethylene glycol n-butyl ether, and ethylene glycol phenyl ether.

5. A process according to claim 1 in which the washing composition contains a nonionic surface active agent, the nonionic surface active agent being a fatty alcohol ethoxylate containing in the group $—(OCH_2CH_2)_aOH$ attached to a fatty hydrocarbon residue of eight to twenty carbon atoms, in which a has a value of one to one hundred.

6. A process according to claim 5 in which the nonionic surface active agent is a polyoxyethylene fatty alcohol selected from the group consisting of polyoxyethylene (2) oleyl ether, polyoxyethylene (4) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (10) oleyl ether, and polyoxyethylene (20) oleyl ether.

7. A process according to claim 1 in which the washing composition contains a siloxane surface active agent, the surface active agent being a trisiloxane having in its molecule a glycol chain connected to silicon by an alkylene linking radical.

8. A process according to claim 1 in which the surface to be cleaned or dewatered is an electronic circuit board or an article made of a material selected from the group consisting of metal, ceramic, glass, and plastic.

9. A process according to claim 8 in which material cleaned from the surface is selected from the group consisting of carbonaceous materials and solder fluxes.

10. A process for cleaning or dewatering a surface which comprises (A) applying to the surface a washing composition comprising a volatile methyl siloxane and an agent for enhancing cleaning or dewatering; (B) while the surface is still wet with the washing composition, rinsing the surface with a rinsing composition comprising an azeotrope or an azeotrope-like composition containing as one of its components a volatile methyl siloxane; and (C) drying or permitting the surface to dry; the azeotrope being a composition that is azeotropic at a temperature within a range selected from the group consisting of 0°–148° C., 0°–162° C., and 12°–108° C., and including a minimum boiling point at 760 Torr; the azeotrope-like composition being a composition that includes all ratios of components that boil within one Centigrade degree of the minimum boiling point of the azeotrope at 760 Torr.

11. A process according to claim 10 in which the azeotrope or the azeotrope-like composition contains hexamethyldisiloxane and a compound selected from the group consisting of 2-pentanol, 3-methyl-3-pentanol, and 1-methoxy-2-propanol.

12. A process according to claim 10 in which the azeotrope or the azeotrope-like composition contains octamethyltrisiloxane and a compound selected from the group consisting of 2-methyl-1-pentanol, 1-butoxy-2-propanol, 1-hexanol, n-propoxypropanol, and ethyl lactate.

13. A process according to claim 10 in which the washing composition contains an agent for enhancing cleaning which is a glycol ether selected from the group consisting of propylene glycol methyl ether, dipropylene glycol methyl ether, tripropylene glycol methyl ether, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, diethylene glycol methyl ether, triethylene glycol methyl ether, ethylene glycol n-butyl ether, diethylene glycol n-butyl ether, triethylene glycol n-butyl ether, and ethylene glycol phenyl ether.

14. A process according to claim 10 in which the washing composition contains a nonionic surface active agent, the nonionic surface active agent being a fatty alcohol ethoxylate containing in the group —$(OCH_2CH_2)_aOH$ attached to a fatty hydrocarbon residue of eight to twenty carbon atoms, in which a has a value of one to one hundred.

15. A process according to claim 14 in which the nonionic surface active agent is a polyoxyethylene fatty alcohol selected from the group consisting of polyoxyethylene (2) oleyl ether, polyoxyethylene (4) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (10) oleyl ether, and polyoxyethylene (20) oleyl ether.

16. A process according to claim 10 in which the washing composition contains a siloxane surface active agent, the surface active agent being a trisiloxane having in its molecule a glycol chain connected to silicon by an alkylene linking radical.

17. A process according to claim 10 in which the surface to be cleaned or dewatered is an electronic circuit board or an article made of a material selected from the group consisting of metal, ceramic, glass, and plastic.

18. A process according to claim 17 in which material cleaned from the surface is selected from the group consisting of carbonaceous materials and solder fluxes.

19. A process according to claim 10 in which the washing composition contains 30 to 99 percent by weight of the volatile methyl siloxane and 1 to 70 percent by weight of a cleaning agent enhancer.

20. A process according to claim 10 in which the washing composition contains 90 to 99.995 percent by weight of the volatile methyl siloxane and 0.005 to 10 percent by weight of a dewatering agent enhancer, the dewatering agent enhancer being selected from the group consisting of a surface active agent, and a non-volatile organic compound exhibiting a vapor pressure of less than 0.1 Torr measured at 20° Centigrade.

21. A process for cleaning or dewatering a surface which comprises (A) applying to the surface a washing composition comprising a volatile methyl siloxane selected from the group consisting of hexamethyldisiloxane and octamethyltrisiloxane, and an agent for enhancing cleaning or dewatering selected from the group consisting of a non-volatile organic compound bearing at least one hydroxyl, ether, or carbonyl group, and a surface active agent; (B) while the surface is still wet with the washing composition, rinsing the surface with a rinsing composition comprising an azeotrope or an azeotrope-like composition containing as components a volatile methyl siloxane selected from the group consisting of hexamethyldisiloxane and octamethyltrisiloxane, and a compound selected from the group consisting of 2-pentanol, 2-methyl-1-pentanol, 3-methyl-3-pentanol, 1-methoxy-2-propanol, 1-butoxy-2-propanol, 1-hexanol, n-propoxypropanol, and ethyl lactate; and then (C) drying or permitting the surface to dry; the azeotrope being a composition that is azeotropic at a temperature within a range of 0°–162° C., and including a minimum boiling point at 760 Torr; the azeotrope-like composition being a composition that includes all ratios of components that boil within one Centigrade degree of the minimum boiling point of the azeotrope at 760 Torr.

22. A process for cleaning or dewatering a surface which comprises (A) applying to the surface a washing composition comprising a volatile methyl siloxane and an agent for enhancing cleaning or dewatering (B) while the surface is still wet with the washing composition, rinsing the surface with a rinsing composition comprising an azeotrope or an azeotrope-like composition containing as one of its components a volatile methyl siloxane; and (C) drying or permitting the surface to dry; the azeotrope being a composition that is azeotropic at a temperature within a range 0–162 ° C., and including a minimum boiling point at 760 Torr; the azeotrope-like composition being a composition that includes all ratios of components that boil within one Centigrade degree of the minimum boiling point of the azeotrope at 760 Torr.

* * * * *